June 2, 1931.    C. C. WILLIAMS    1,807,719
VALVE ACTUATING MECHANISM
Filed April 7, 1927
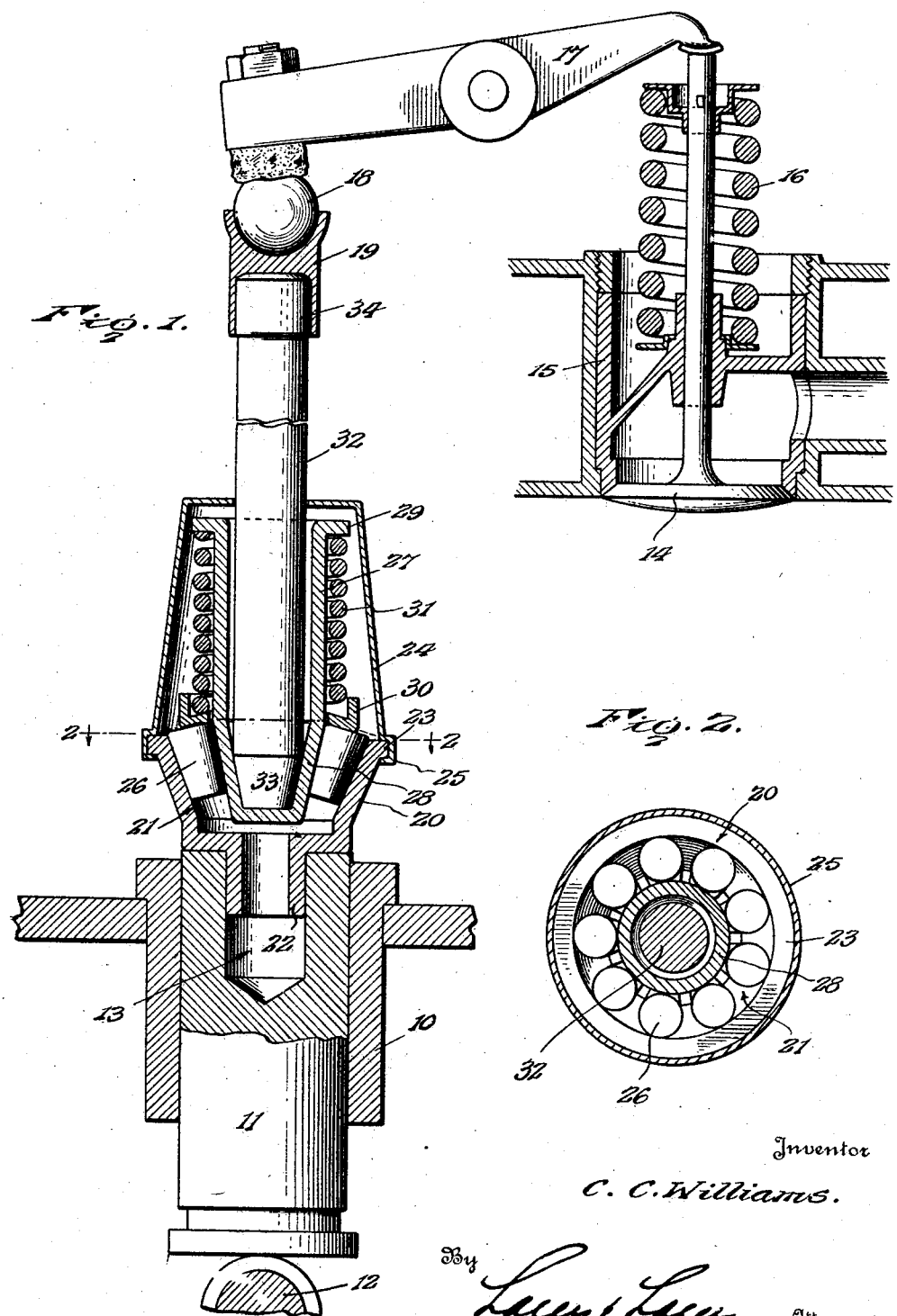

Patented June 2, 1931

1,807,719

UNITED STATES PATENT OFFICE

CALVIN C. WILLIAMS, OF PHILADELPHIA, PENNSYLVANIA

VALVE ACTUATING MECHANISM

Application filed April 7, 1927. Serial No. 181,787.

This invention relates to an improved valve actuating mechanism which, in its general characteristics, is similar to the mechanism disclosed in my co-pending application filed March 17, 1926, Serial No. 95,361, as well as the mechanism disclosed in my later co-pending application filed November 26, 1926, Serial No. 148,054.

The invention seeks, among other objects, to provide a mechanism including a push rod which incorporates a novel slip joint automatically operable to accommodate lengthening or shortening of the rod, and wherein said joint will include male and female joint members permanently assembled to provide a separate and distinct joint unit, one of the members of which is formed to removably receive a push rod element.

A further object of the invention is to provide a mechanism wherein the expansive force of the spring of the joint will be utilized at both ends of the spring for lengthening the mechanism.

And the invention seeks, as a still further object, to provide a mechanism capable of economic manufacture and wherein the possibility of loss or dislocation of any of the parts prior to actual installation of the mechanism will be eliminated while also, actual installation will be rendered simple and easy.

Other objects of the invention not specifically mentioned in the foregoing will appear during the course of the following description.

In the accompanying drawings,

Figure 1 is a vertical sectional view showing my improved mechanism in connection with a conventional overhead valve, and Figure 2 is a transverse sectional view on the line 2—2 of Figure 1 looking in the direction indicated by the arrows, this view particularly showing the clutch rollers of the slip joint.

Referring now more particularly to the drawings, I have shown a fixed tappet guide at 10, and slidable through said guide is a tappet 11 operable by a cam shaft 12, the tappet being provided at its upper end with a customary axial socket 13. A conventional overhead valve of an internal combustion engine is indicated at 14, and slidably supporting the valve is a cage 15, the valve being normally held closed by a spring 16. Mounted to coact with the upper end of the valve stem is a rocker 17 carrying an adjustable ball 18, and formed to coact with the ball is a socket 19.

In carrying the invention into effect, I employ a push rod embodying a female clutch member which includes a clutch cup 20 having a conical inner face 21, and projecting from the flat bottom wall of said cup is a depending tubular stud 22 which freely fits in the socket 13 of the tappet 11 so that the bottom wall of the cup thus rests flat against the upper end of the tappet. Formed on the cup at its upper end is an overhanging annular flange 23, and fitting said flange is a frusto-conical cap or housing 24 provided at its lower end with a flange 25 tightly embracing the flange 23 for rigidly connecting the cap to the cup.

Disposed within the clutch cup is a series of conical or longitudinally tapered clutch rollers 26, and housed within the cap 24 is a tubular male clutch member 27 tapered at its lower end portion to provide a clutch cone 28 which rests within the series of rollers 26 to coact therewith, the clutch member being closed at its lower end by an end wall. Formed on the upper end of the clutch member 27 is an overhanging annular flange 29, and freely surrounding said member to rest against the larger upper ends of the rollers 26 is an annular follower 30 upturned at its peripheral margin to provide a spring seat. Resting at its lower end within said seat and at its upper end against the flange 29 of the clutch member 27 is a spring 31.

Extending freely through the top wall of the cap 24 of the female clutch member 20 is a push rod element 32 which is freely accommodated within the male clutch member 27 and is provided at its lower end with a tapered terminal 33 snugly but removably fitting within the tapered clutch cone 28 of said member, the male clutch member thus providing a socket for said element. At its upper end the element 32 is provided with a slightly enlarged head 34 and, as will be observed, said head is shaped to accommodate the socket 19 which is removably slipped over said head.

As will be observed, the male clutch member 27 and associated parts are enclosed by the female clutch member 20 and cap 24 to provide a permanently assembled slip joint which is separate and distinct so that, when installing the mechanism, the slip joint may be first connected with the tappet 11, when the push rod element 32 may be inserted at its lower end into the male clutch member 27 and the socket 19 disposed on the upper end of said element to coact with the ball 18. Furthermore, in thus permanently assembling the parts of the slip joint, the possibility of loss or dislocation of said parts, prior to actual installation of the joint, is eliminated. Before the joint is installed, the flange 29 of the male clutch member 27 is held against the top wall of the cap 24 by the spring 31. However, at the time of installation of the mechanism, the ball 18 is adjusted downwardly on the rocker 17 for partially depressing the push rod element 32 and consequently partially depressing the male clutch member 27, as shown in Figure 1, so as to provide a clearance between the upper end of the male clutch member and the top wall of the cap as well as to take up all looseness and play in the mechanism between the cam shaft and valve stem. As will be seen, the spring 31 will press downwardly at its lower end on the clutch rollers 26 and cause said rollers to coact with the clutch cone 28 of the male clutch member for forcing said member upwardly while also, the upper end of the spring will press upwardly on the flange 29 of said member for lifting the member. The expansive action of the spring will thus be utilized at both ends of the spring for increasing the effective length of the mechanism. Upward movement of the push rod element 32 under the urge of the spring 31 will, of course, be limited by the engagement of the rocker 17 with the upper end of the stem of the valve 14 so that since the clutch cone 28 of the clutch member 27 will thus, in effect, provide for the clutch rollers 26, an abutment limited against upward movement, said rollers will also coact with the clutch cup 20 for forcing said cup downwardly and constantly holding the cup in solid engagement with the upper end of the tappet 11. Play between the parts will thus always be taken up and looseness or rattling permanently avoided. Moreover, the tappet 11 will be constantly held against the coacting cam of the shaft 12 so that tappet rattling will also be eliminated. The spring 31 is, of course, far less in strength than the spring 16, so that at no time will the spring 31 appreciably effect the functioning of the valve spring.

Assuming now that the tappet 11 is raised, the upward thrust or jar of the tappet will, as will be observed, be transmitted directly to the clutch rollers 26 and, of course, at the instant such upward thrust is transmitted to said rollers, the push rod element 32, rocker 17 and valve 14 will be at rest. Accordingly, the inertia of these parts will be sufficient to maintain the push rod element stationary momentarily and oppose the upward thrust or jar of the tappet with sufficient force to cause upward endwise slipping of the clutch rollers with a coincident upward movement of the clutch cup 20 independently of the clutch cone 28. The follower 30 is therefore shifted upwardly by the rollers to compress the spring 31 and, due to the difference in the angularity of the clutch face 21 of the cup and the face of the clutch cone, the rollers are, of course, independently shifted upwardly a distance greater than the independent upward movement of the clutch cup. The push rod is thus automatically contracted, but as the tappet continues in its upward movement and the inertia of the push rod element, rocker, valve and valve stem is overcome, the upward slipping of the clutch rollers is arrested substantially at the instant the push rod element begins to yield to the upward movement of the tappet, when said rollers wedge between the clutch face 21 of the cup and the clutch cone 28 of the male clutch member 27 to provide a rigid connection between said cup and the push rod element so that the valve is opened. Due to the automatic contraction of the push rod as the valve is opened, the opening travel imparted to the valve will be correspondingly shortened. Accordingly, upon the return of the tappet downwardly, the valve will seat before the tappet reaches the bottom of its throw so that the push rod element 32 will be relieved of the downward pressure exerted thereon by the valve spring 16. As a result, the spring 31 will, as the tappet completes its downward movement, expand for again shifting the clutch rollers downwardly within the clutch cup and thus lift the push rod element 32, so that the parts will be returned to their original positions while all looseness between the parts will be automatically taken up. Rattling will thus be effectually prevented. Should the valve fail to seat properly, the push rod will, as will be understood in view of the foregoing description, automatically expand to compensate for the shortened closing travel of the valve while, when the valve is subsequently permitted to move into engagement with its seat, the repeated jarring communicated from the tappet to the clutch rollers incident to the actuation of the tappet, will cause said rollers to slip upwardly so that the push rod will be automatically contracted to compensate for the increased closing travel of the valve.

Having thus described the invention what I claim is:

1. An automatic take-up device including a female clutch member, a tubular male clutch member extending therein, clutch elements interposed between said members, a spring acting on the male member and said elements and urging said elements to coact with the members, said male member being closed at its lower end to provide a socket for an element operable to open a valve, and a cap fixed to said female member and housing the male member, the cap being disposed to limit the male member against displacement out of the female member.

2. An automatic take-up device including coacting spring pressed clutch members automatically operable to either increase or decrease the effective length of said device and permanently assembled to provide a separately removable joint unit, one of said members being permanently enclosed within the joint and formed to receive a rod element operable for opening a valve.

3. An automatic take-up device including a female clutch cup provided with an inner conical clutch face, a male clutch member extending into the cup and provided with a conical clutch face, tapered clutch rollers disposed between said faces and coacting therewith, and yieldable means interposed between the male member and said rollers for advancing the rollers and retracting the male clutch member in a direction out of said cup.

4. An automatic take-up device including a female clutch cup provided with an inner conical clutch face, a male clutch member extending into the cup and provided with a conical clutch face, tapered clutch rollers disposed between said faces and coacting therewith, yieldable means interposed between the male member and said rollers for advancing the rollers and retracting the male member in a direction out of said cup, and a cap carried by said cup and adapted to limit the male member in its retractive movement.

5. An automatic take-up device including companion clutch members, clutch elements interposed therebetween, a spring acting on one of said members and said elements and urging said elements to coact with said members, and a cap enclosing said first-mentioned member and permanently fixed to the other of said members for permanently retaining all of the parts in assembled relation and limiting said first-mentioned member in its movement under the action of said spring.

In testimony whereof I affix my signature.

CALVIN C. WILLIAMS. [L. S.]